Patented Nov. 20, 1923.

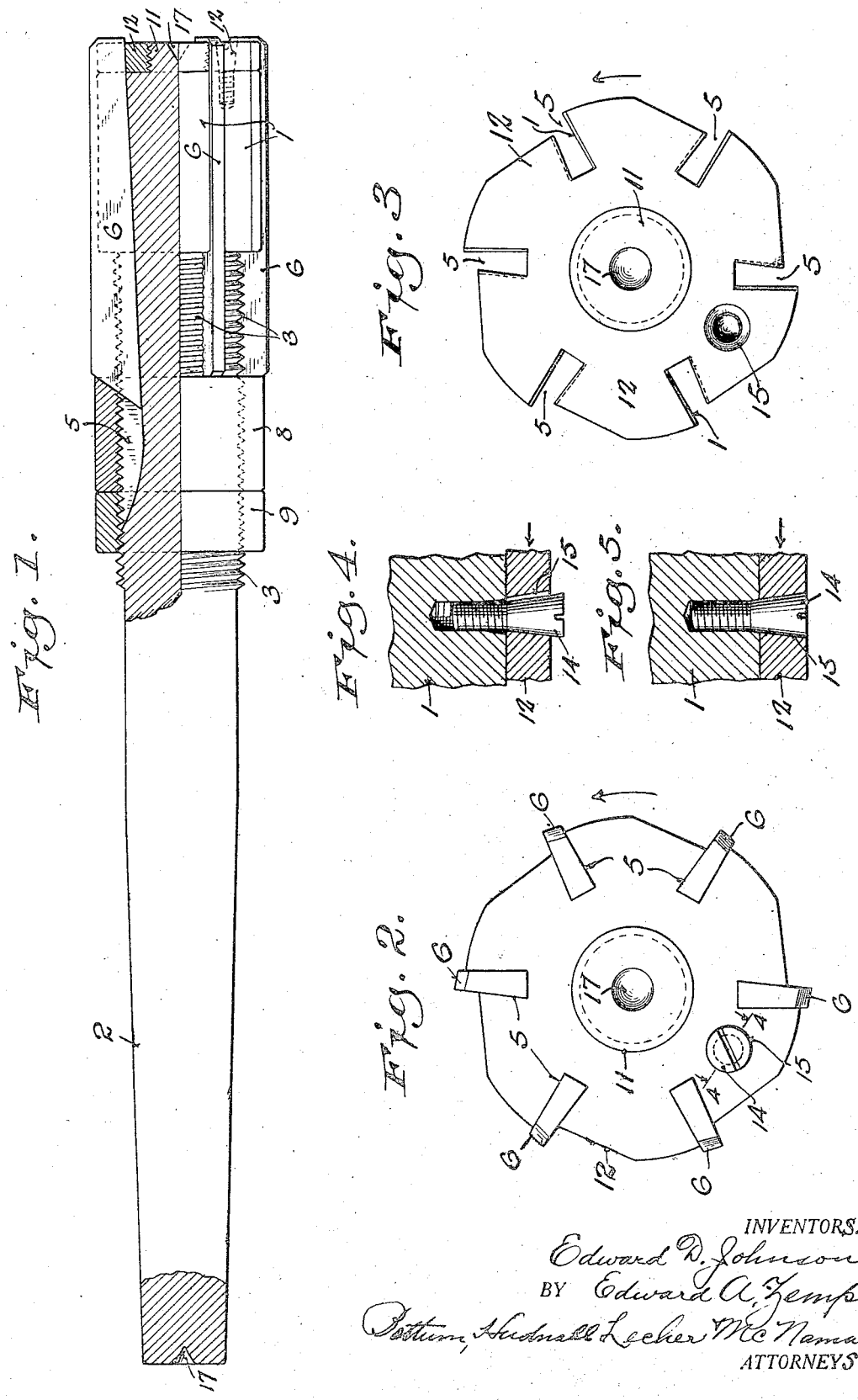

1,474,369

UNITED STATES PATENT OFFICE.

EDWARD D. JOHNSON AND EDWARD A. ZEMPEL, OF MILWAUKEE, WISCONSIN, ASSIGNORS TO WETMORE REAMER COMPANY, OF MILWAUKEE, WISCONSIN, A CORPORATION OF WISCONSIN.

REAMER.

Application filed May 14, 1923. Serial No. 638,747.

*To all whom it may concern:*

Be it known that we, EDWARD D. JOHNSON and EDWARD A. ZEMPEL, citizens of the United States, residing at Milwaukee, in the county of Milwaukee and State of Wisconsin, have invented certain new and useful Improvements in Reamers, of which the following is a specification, reference being had to the accompanying drawing, forming a part thereof.

This invention relates more particularly to the construction of comparatively small expansible reamers having inserted blades and means for fastening the blades of such reamers.

The main objects of the invention are to securely fasten and firmly hold the adjustable blades in proper position in the reamer body without weakening the body; to utilize the cutting strain on the blades to bind the blades more tightly and firmly in place under working conditions; to prevent the cutting strain to which the blades and the front fastening nut are subjected from shearing off or injuring the blades and the stud on which the nut is threaded; to facilitate and insure grinding and sharpening the blades evenly and exactly coaxial or concentric with the body; and generally to improve the construction and operation of reamers of this type.

It consists in the construction, arrangement and combination of parts as hereinafter particularly described and pointed out in the claims.

In the accompanying drawing like characters designate the same parts in the several figures.

Figure 1 is a side elevation and partial longitudinal section of a reamer embodying the invention; Fig. 2 is an enlarged end view as seen from the right relative to Fig. 1; Fig. 3 is a similar view showing the blade grooves in the clamping nut at the front end of the reamer turned backward out of register with the blade grooves in the body, the blades and locking screw being omitted; Fig. 4 is a section on the line 4—4, Fig. 2, showing the locking screw as partially unscrewed from the body, to permit the blade grooves in the clamping nut to be brought into register with the blade grooves in the body; and Fig. 5 is a similar section showing the locking screw with its tapered head advanced into the tapered portion of the screw hole in the body so as to lock the clamping nut with its blade grooves out of register with the blade grooves in the body, as shown in Fig. 3.

The reamer comprises, as shown in Fig. 1, a body 1, formed with a reduced shank 2, having a threaded portion 3, next to the body.

The body is formed with longitudinal blade grooves 5, extending at their rear ends into the threaded portion 3 of the shank and having their bottoms inclined outwardly towards their front ends. The leading or advance walls of the blade grooves 5 with relation to the direction of working rotation of the reamer, as indicated by arrows in Figs. 2 and 3, are inclined backwardly towards their trailing or back walls to prevent the removal or displacement of the correspondingly shaped blades 6 radially, and at the same time permit longitudinal adjustment of the blades in the head 1.

The rear wider ends of the blades 6 are beveled, as shown in Fig. 1, to fit into the internally beveled or conically countersunk front end of an adjusting nut 8, which is fitted on the threaded portion 3 of the shank and is held in adjusted position thereon by a lock nut 9.

At its front end the body of the reamer is formed with a reduced extension or stud 11, on which a clamping nut 12 is threaded. The clamping nut is formed with blade grooves spaced and shaped to correspond with the blade grooves in the body 1, and slightly offset backward and out of register with the blade grooves in the body, as shown in Fig. 3, when the nut is screwed tightly against the end of the body. To provide for this slight offset so that the leading walls of the grooves in the nut 12 will tightly pinch and clamp the blades 6 between them and the opposite trailing walls of the grooves in the body, the nut 12 is first threaded on the stud 11, and screwed tightly against the end of the body 1, and the blade grooves are then formed in both the body and nut. The nut is then removed and its face next to the body or the end face of the body, is lapped or dressed, so that when the nut is replaced and screwed tightly against the end of the body, the blade grooves therein will be slightly offset backward from the blade grooves in the body, as shown somewhat exaggeratively in Fig. 3.

To turn the leading walls of the blade grooves in the clamping nut 12 backward relative to the body 1, and to lock and hold them tightly against the leading sides of the blades 6 adjacent the front end of the reamer, a screw 14 having a tapered head, is threaded, as shown in Figs. 4 and 5, in the end of the body 1, and the nut is formed with a tapered hole which corresponds with the tapered head of the screw and registers with the screw hole in the body, as shown in Figs. 3 and 5, when the nut is screwed tightly against the end of the body.

The screw hole in the body 1, in which the screw 14 is threaded, is counterbored conically, as shown in Figs. 4 and 5, to form a continuation of the conical hole 15 in the nut when the holes are brought into exact register, as shown in Fig. 5, and to permit the tapered head of the screw when advanced into the body, to turn the nut slightly backward, as indicated by arrows on Figs. 4 and 5, and to tightly clamp and hold the blades in the grooves at the front end of the reamer.

The stud 11 at the front end of the reamer and the opposite end of the shank 2, which are integral with the body, are formed with conical center seats 17, to facilitate and insure grinding and sharpening the blades 6 exactly concentric with the axis of the reamer.

In the operation of the reamer, the cutting strain to which the blades are subjected, tends to turn the clamping nut 12 backward and thus more tightly grip the blades adjacent their front ends and screw the nut more tighly against the end of the reamer body, thereby preventing the nut under severe strains, from shearing or distorting the blades and the stud 11 on which the nut is threaded.

The reamer is expanded by turning the locking screw 14 backward, as shown in Fig. 4, and loosening the nut 12 and the lock nut 9, thus releasing the blades and then screwing the nut 8 forward on the threaded portion 3 of the shank, thereby advancing the blades 6 lengthwise in the grooves 5 and at the same time gradually shifting them radially outward.

When the desired adjustment is effected, the lock nut 9 is screwed tightly against the adjusting nut 8, and the clamping nut 12 is turned backward by means of the taper headed locking screw 14, tightly against the leading sides of the blades and against the end of the body 1.

The blades being advanced in expanding the reamer towards its front end, project more or less beyond the nut 12, and are thus adapted to ream and finish bottom or blind holes.

The dovetailed shape of the grooves 5 and blades 6, as hereinbefore stated, prevents radial displacement of the blades when they are released, and when they are fastened by tightening the nuts 9 and 12, they are rigidly held in place in the head 1, the internally coned end of the nut 8 engaging the beveled rear ends of the blades and firmly holding the inner edges of the blades against the bottoms of the grooves, and the nut 12 clamping and holding the blades adjacent their front ends tightly against the trailing walls of the grooves.

By the means hereinbefore described for adjusting and fastening the blades in place in the reamer head, the mutilation and weakening of the head by forming screw holes therein according to the common practice for individually fastening the front ends of the blades by set screws, is avoided, and the adjustment of the blades and expansion of the reamer are facilitated, the manipulation of separate fastening screws for the several blades being thus avoided.

Various changes in the minor details of construction and arrangement of parts of the reamer may be made without departure from the principle and scope of the invention as defined in the following claims.

We claim:

1. In a reamer the combination of a body having longitudinal blade grooves and a stud at the front end, and a clamping nut threaded on the stud and formed with correspondingly spaced blade grooves which are slightly offset backward from the grooves in the body when the nut is screwed tightly against the end of the body.

2. In a reamer the combination of a body formed with a central stud at its front end and with longitudinal blade grooves having their leading walls inclined outwardly and backwardly towards their trailing walls, and a nut threaded on the stud and formed with correspondingly shaped and spaced grooves adapted to pass backward slightly out of register with the grooves in the body when the nut is screwed tightly against the adjoining end of the body.

3. In a reamer the combination of a body formed with a central stud at its front end and with longitudinal blade grooves having bottoms inclined outwarly towards its front end, and a nut threaded on the stud and formed with correspondingly spaced grooves, the leading walls of which are adapted to pass backward slightly out of alignment with the leading walls of the body grooves when the nut is screwed against the end of the body.

4. In a reamer the combination of a body formed with longitudinal blade grooves and at the front end with a central stud, a clamping nut threaded on the stud and formed with correspondingly spaced blade grooves adapted to pass backward slightly out of register with the grooves in the body when the nut is screwed against the end of the body, and a locking screw threaded in the body and having a tapered head fitting a tapered hole extending through the nut into the body, the tapered hole in the nut registering with the tapered part of the screw hole in the body when the nut is screwed against the end of the body and the blade grooves in the nut are out of register with the blade grooves in the body.

5. In a reamer the combination of a body formed with longitudinal blade grooves having bottoms inclined outwardly towards its front end, a central stud at its front end and a threaded shank at the rear end; blades fitted in said grooves and having beveled rear ends, a nut threaded on the shank and conically countersunk at the front end to fit over the beveled rear ends of the blades, and a clamping nut threaded on said stud and formed with blade grooves corresponding with the grooves in the body and offset backward therefrom when the nut is screwed tightly against the end of the body.

In witness whereof we hereto affix our signatures.

EDWARD D. JOHNSON.
EDWARD A. ZEMPEL.